United States Patent
Venugopal et al.

(10) Patent No.: US 10,523,387 B2
(45) Date of Patent: Dec. 31, 2019

(54) METHOD AND SYSTEM FOR TRANSMISSION OF SIGNALS WITH EFFICIENT BANDWIDTH UTILIZATION

(71) Applicant: GM GLOBAL TECHNOLOGY OPERATIONS LLC, Detroit, MI (US)

(72) Inventors: Prathap Venugopal, Troy, MI (US); Unmesh Dutta Bordoloi, Troy, MI (US); Soheil Samii, Royal Oak, MI (US); Prachi Joshi, Blacksburg, VA (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 15/878,597

(22) Filed: Jan. 24, 2018

(65) Prior Publication Data
US 2019/0229866 A1    Jul. 25, 2019

(51) Int. Cl.
*G06F 11/00* (2006.01)
*H04L 5/00* (2006.01)

(52) U.S. Cl.
CPC .......... *H04L 5/0044* (2013.01); *H04L 5/0064* (2013.01)

(58) Field of Classification Search
CPC ..................... H04L 5/0044; H04L 5/0064
USPC ................................ 370/254, 252
See application file for complete search history.

(56) References Cited

U.S. PATENT DOCUMENTS

| | | | | |
|---|---|---|---|---|
| 5,809,460 A | * | 9/1998 | Hayata | G10L 19/012 704/225 |
| 9,369,772 B1 | * | 6/2016 | Fei | H04N 21/6373 |
| 2014/0133350 A1 | * | 5/2014 | Triess | H04L 41/0893 370/254 |
| 2017/0264718 A1 | * | 9/2017 | Hamed | H04L 12/4625 |

OTHER PUBLICATIONS

Prachi Joshi, S. S. Ravi, Shoheil Samil, Unmesh D. Bordoloi, Sandeep K. Shukla, and Haibo Zeng; "Offset Assignment to Signals for improving Frame Packing in CAN-FD", presented at (Year: 2017).*
Prachi Joshi, S. S. Ravi, Soheil Samii, Unmesh D. Bordoloi, Sandeep K Shukla, and Haibo Zeng; "Offset Assignment to Signals for Improving Frame Packing in CAN-FD", presented at RTSS, Dec. 7, 2017.

* cited by examiner

*Primary Examiner* — Chuong T Ho
(74) *Attorney, Agent, or Firm* — Quinn IP Law

(57) ABSTRACT

A system and method for transmitting a plurality of signals. The system includes a transmitting terminal configured to obtain and pack the plurality of signals in multiple signal sequences, with each of the plurality of signals having respective predefined periods. A receiving terminal is configured to receive and unpack the multiple signal sequences from the transmitting terminal. A controller is in communication with the transmitting terminal and the receiving terminal and configured to store a look-up table. The look-up table includes a respective pre-identifier and respective identifier for each of the plurality of signals. The controller is configured to determine if the respective predefined periods vary in magnitude within a frame. If so, the controller is configured to obtain the respective pre-identifiers and respective identifiers for each of the plurality of signals. The multiple signal sequences are based at least partially on the respective pre-identifiers and the respective identifiers.

20 Claims, 4 Drawing Sheets

METHOD AND SYSTEM FOR TRANSMISSION OF SIGNALS WITH EFFICIENT BANDWIDTH UTILIZATION

The present disclosure relates generally to a method and system for transmission of signals with efficient bandwidth utilization. Due to the ever increasing complexity of devices (including but not limited to vehicles), a variety of network layer protocols, physical interfaces, digital hierarchies and transmission mediums are employed to facilitate communication between various sub-systems of the respective devices. However, the increase in the number of signals being communicated between various sub-systems of the respective devices results in an increased load and bandwidth requirement.

SUMMARY

Disclosed herein is a system and method for transmitting a plurality of signals. The system includes a transmitting terminal configured to obtain and pack the plurality of signals in multiple signal sequences, with each of the plurality of signals having respective predefined periods. A receiving terminal is configured to receive and unpack the multiple signal sequences from the transmitting terminal. The multiple signal sequences are configured to be packed in a frame and transported from the transmitting terminal to the receiving terminal via a network connection. A controller is in communication with the transmitting terminal and the receiving terminal and configured to store a look-up table. The look-up table includes a respective pre-identifier and respective identifier for each of the plurality of signals.

The controller includes a processor and tangible, non-transitory memory on which is recorded instructions. Execution of the instructions by the processor causing the controller to determine if the respective predefined periods vary in magnitude within the frame. If the respective predefined periods vary in magnitude within the frame, then the controller is configured to (and the method includes) obtain the respective pre-identifiers for each of the plurality of signals. The multiple signal sequences are based at least partially on the respective pre-identifiers and the respective identifiers. A secondary receiving terminal may be configured to receive and unpack the multiple signal sequences from the transmitting terminal at a same time as the receiving terminal.

The transmitting terminal may include a first communication layer and a first driver layer. The first driver layer may be configured to operate an interface between the network connection and the transmitting terminal. The controller may be configured to pack the plurality of signals in the multiple signal sequences into a first plurality of interaction layer protocol data units in the first communication layer. The controller may be configured to package the first plurality of interaction layer protocol data units in the frame using a frame identifier in the first driver layer. The receiving terminal may include a second communication layer and a second driver layer. The second driver layer may be configured to operate an interface between the network connection and the receiving terminal. The controller may be configured to extract the frame into a second plurality of interaction layer protocol data units based in part on the look-up table. The controller may be configured to unpack the multiple signal sequences from the second plurality of interaction layer protocol data units in the second driver layer into the plurality of signals.

Prior to determining if the respective predefined periods vary in magnitude within a frame, the controller may be configured to sort and initialize the plurality of signals. If the respective predefined period is a constant, then the controller is configured to determine a respective bandwidth utilization factor for a plurality of potential frames. The plurality of signals may be added to one of the plurality of potential frames that has the minimum value of the respective bandwidth utilization factor.

Each of the multiple signal sequences has a respective payload portions and respective header portions. If the respective predefined period varies in magnitude, then the controller is configured to add a respective reset bit to the respective payload portions of the multiple signal sequences. The reset bit is configured to have a first value when a transmission of the frame has been reset and second value when the transmission of the frame has not been reset. The controller is configured to set the reset bit with at least one of a first value and a second value upon occurrence of a transmission error. The reset bit is set with the first value when a transmission of the frame has been reset and with the second value when the transmission of the frame has not been reset.

If the respective predefined periods vary in magnitude, then the controller may be configured to determine if the frame is new or existing. If the frame is new, a respective entry is created with a respective identifier and the respective pre-identifier. The controller is configured to populate the respective entry in the look-up table. If the frame is existing (i.e., there is already an entry in the look-up table with the respective identifier), the controller may be configured to locate the respective entry in the look-up table having an identical value as the respective identifier and determine if the respective pre-identifier is new or existing. If the respective pre-identifier is existing, the controller is configured to populate the respective entry in the look-up table. If the respective pre-identifier is new, then respective entry is created with a respective pre-identifier and the controller is configured to populate the respective entry in the look-up table.

The method includes creating a look-up table in the controller, the look-up table including a respective pre-identifier and a respective identifier for each of the plurality of signals. The method includes obtaining and packing the plurality of signals in multiple signal sequences, via the transmitting terminal, with each of the plurality of signals having respective predefined periods. The method includes packing the multiple signal sequences into a frame and transporting from the transmitting terminal to the receiving terminal through a network connection, via the controller. The method includes receiving and unpacking the multiple signal sequences in the frame, via the receiving terminal.

The method includes packing the plurality of signals in the multiple signal sequences into a first plurality of interaction layer protocol data units in the first communication layer and packaging the first plurality of interaction layer protocol data units in the frame using a frame identifier in the first driver layer. The method includes extracting the frame into a second plurality of interaction layer protocol data units based in part on the look-up table and unpacking the multiple signal sequences from the second plurality of interaction layer protocol data units in the second driver layer into the plurality of signals.

The above features and advantages and other features and advantages of the present disclosure are readily apparent from the following detailed description of the best modes for carrying out the disclosure when taken in connection with the accompanying drawings.

DETAILED DESCRIPTION

Figure 1:
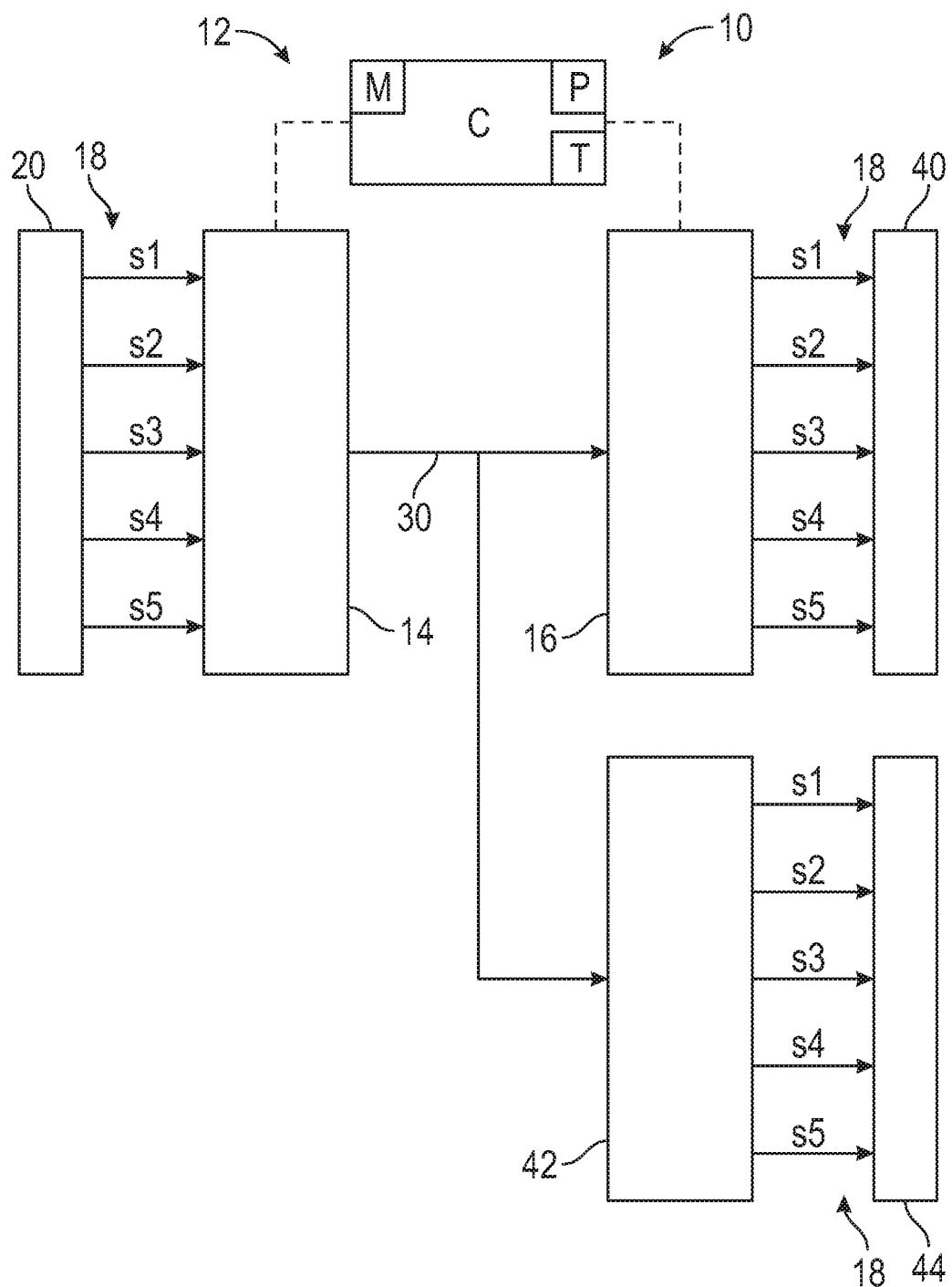
FIG. 1 is a schematic illustration of a system including a transmitting terminal and a receiving terminal.

Referring to the drawings, wherein like reference numbers refer to like components, FIG. 1 schematically illustrates a system 10, which may be part of a device 12. The device 12 may be a mobile platform, such as, but not limited to, a passenger car, sport utility vehicle, light truck, heavy duty vehicle, ATV, minivan, bus, transit vehicle, bicycle, robot, farm implement, sports-related equipment, boat, plane, train or other transportation device. The device 12 may be a non-mobile platform, such as, but not limited to, a desktop computer, household appliance, medical device, home automation unit and industrial automation unit. The device 12 may take many different forms and include multiple and/or alternate components and facilities.

Referring to FIG. 1, the system 10 includes a transmitting terminal 14 and a receiving terminal 16. The transmitting terminal 14 is configured to obtain and pack a plurality of signals 18 from a first application 20 in a respective sequence. In the example shown in FIG. 1, the plurality of signals 18 includes individual signals s1, s2, s3, s4 and s5. However, it is to be understood that the number of signals may be varied based on the application at hand. The receiving terminal 16 is configured to receive the plurality of signals 18 from the transmitting terminal 14, via a network connection 30. The network connection 30 is configured to link one or more units for data exchange. The network connection 30 may include, but is not limited to: Controller Area Network (CAN), Controller Area Network with Flexible Data Rate (CAN-FD), Ethernet and others. The plurality of signals 18 are forwarded to a second application 40, via the receiving terminal 16. Stated differently, the plurality of signals 18 are encoded in the transmitting terminal 14, sent over a communication link (i.e., the network connection 30) and decoded at the receiving terminal 16. If the device 12 is a vehicle for example, the first application 20 may be a window roll-down sensor (not shown) activated by a user of the vehicle and the second application 40 may be the mechanism that physically rolls down the vehicle window (not shown). The plurality of signals 18 are may be forwarded to more than one receiving terminal at the same time. Referring to FIG. 1, a secondary receiving terminal 42 may be configured to receive the plurality of signals 18 at the same time from the transmitting terminal 14, via a network connection 30, and subsequently forwarded to a third application 44.

Figure 2:
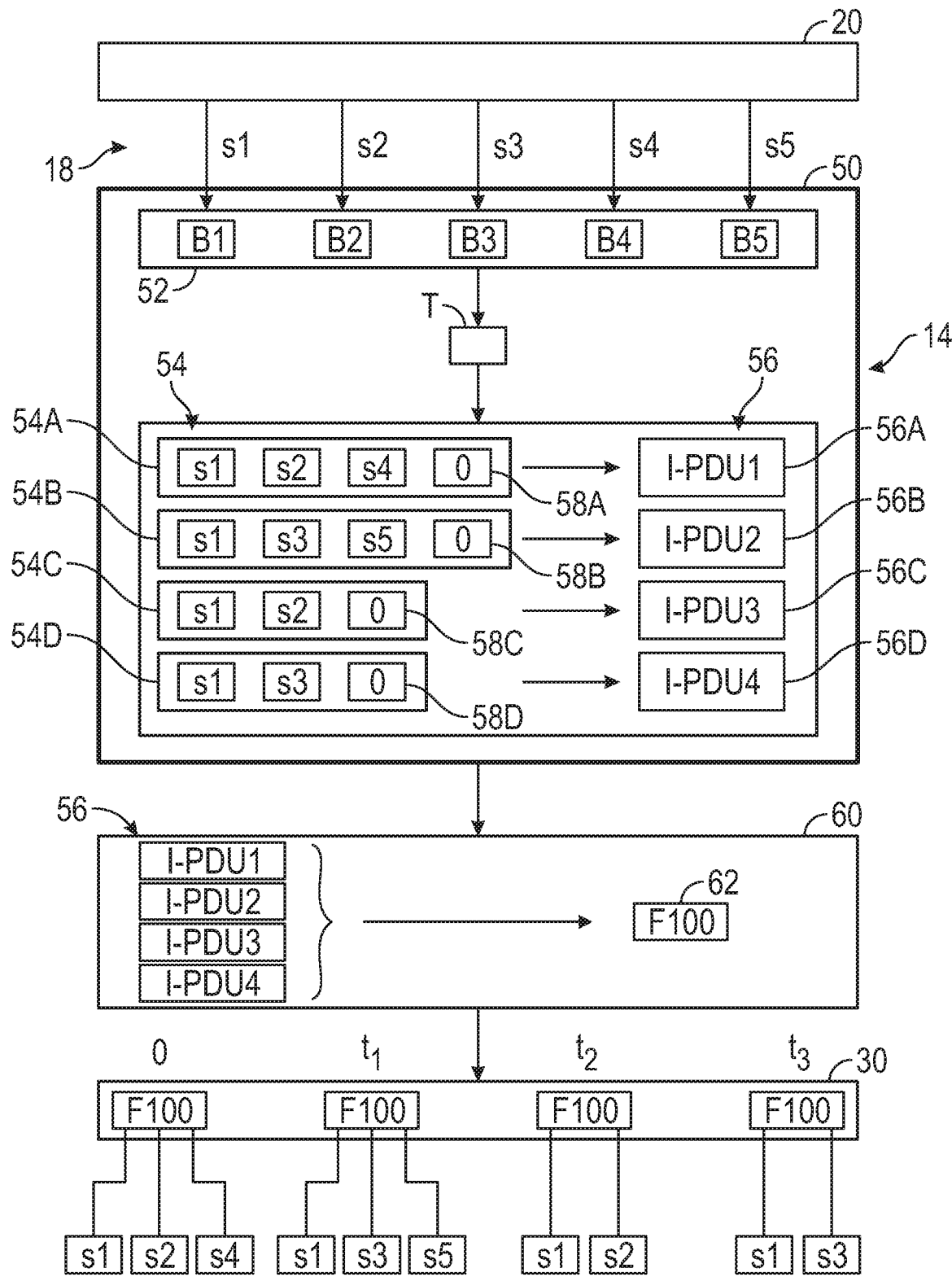
FIG. 2 is a schematic example of a transmitting terminal.
Figure 3:
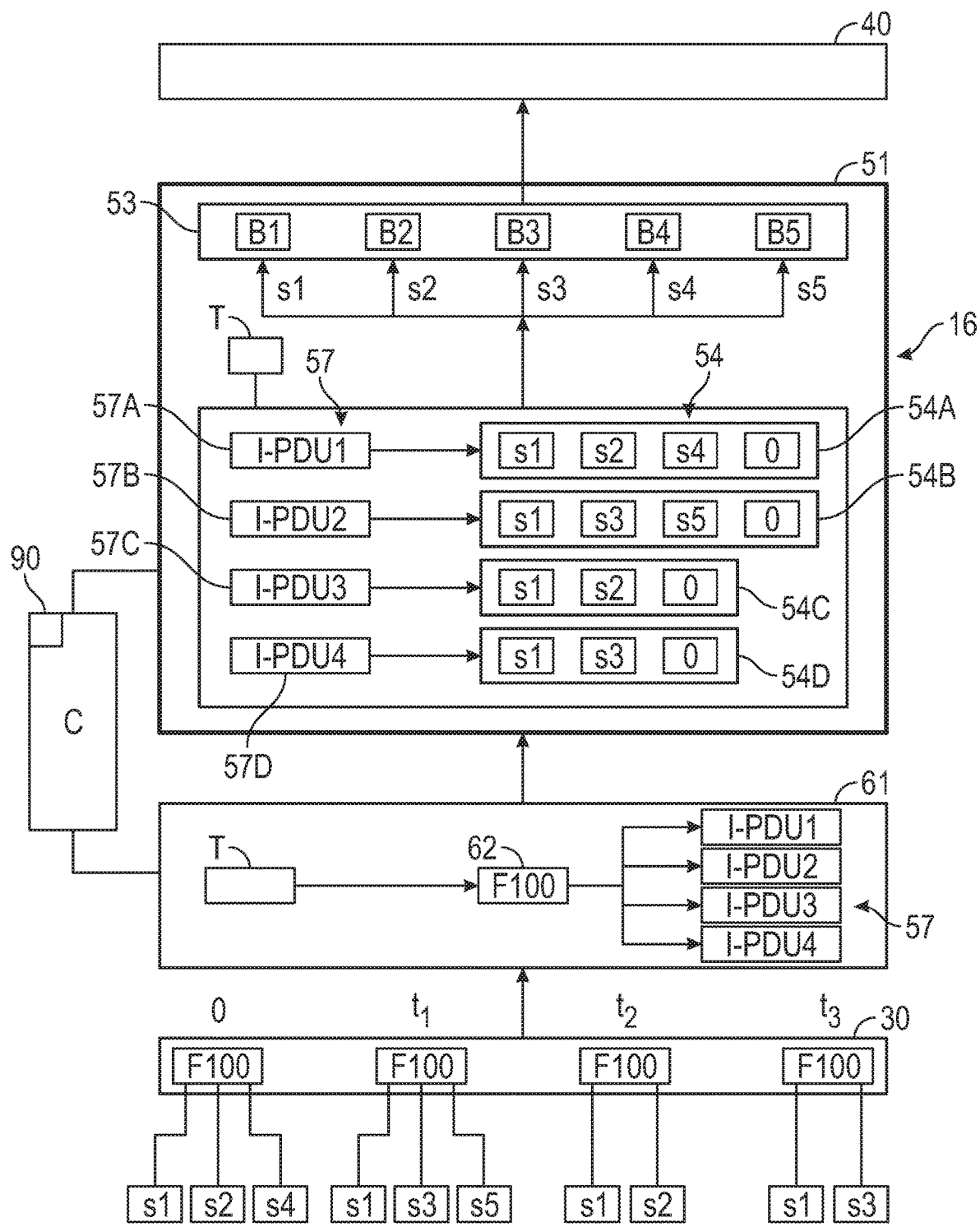
FIG. 3 is a schematic example of a receiving terminal.

Referring to FIG. 1, the system 10 includes a controller C in communication (e.g., in electronic communication) with both the transmitting terminal 14 and the receiving terminal 16. An example configuration for the transmitting terminal 14 is shown in FIG. 2. An example configuration for the receiving terminal 16 is shown in FIG. 3. It is to be understood that the configurations shown in FIGS. 2 and 3 are intended as non-limiting examples and other suitable configurations may be employed. The controller C includes at least one processor P and at least one memory M (or non-transitory, tangible computer readable storage medium) on which are recorded instructions for executing method 100 (described below with respect to FIG. 4). The memory M can store controller-executable instruction sets, and the processor P can execute the controller-executable instruction sets stored in the memory M.

Referring to FIG. 2, the transmitting terminal 14 may include a first communication layer 50 and a first driver layer 60. The first communicating layer 50 may include, but is not limited to, a run-time environment (RTE). The first driver layer 60 may be a Controller Area Network (CAN) driver. The first driver layer 60 may be configured to operate or control an interface between the network connection 30 and the transmitting terminal 14. The plurality of signals 18 from the first application 20 may be stored in a first plurality of buffers 52 (shown individually as B1, B2, B3, B4 and B5, in FIG. 2 and configured to store the signals s1, s2, s3, s4 and s5, respectively).

The controller C is configured to store a look-up table (labeled as "T" in FIGS. 1-3). The look-up table (T) includes a respective pre-identifier for each of the plurality of signals 18 and is configured to be accessible to both the transmitting terminal 14 and the receiving terminal 16. Referring to the example table shown below, each of the plurality of signals 18 has a respective predefined period (or cycle time), predefined size, a respective identifier (ID) and respective pre-identifier (pre-ID). It is to be understood that the size and period of the signals may be varied based on the application at hand.

Example Table

| Signal | Size | Period | Pre-ID | ID | I-PDU |
|---|---|---|---|---|---|
| s1 | 2 | 10 | 00 | 100 | I-PDU1 |
| s2 | 4 | 20 | 00 | 100 | I-PDU1 |
| s4 | 4 | 40 | 00 | 100 | I-PDU1 |
| s1 | 2 | 10 | 01 | 100 | I-PDU2 |
| s3 | 4 | 20 | 01 | 100 | I-PDU2 |
| s5 | 4 | 40 | 01 | 100 | I-PDU2 |
| s1 | 2 | 10 | 10 | 100 | I-PDU3 |
| s2 | 4 | 20 | 10 | 100 | I-PDU3 |
| s1 | 2 | 10 | 11 | 100 | I-PDU4 |
| s3 | 4 | 20 | 11 | 100 | I-PDU4 |

Referring to FIG. 2, the plurality of signals 18 are packed in multiple signal sequences 54 into a first plurality of interaction layer protocol data units 56 (I-PDU1, I-PDU2, I-PDU3, I-PDU4 in FIGS. 2-3 and in the example look-up table above). In the example shown, there are four signal sequences 54A, 54B, 54C, 54D that are packed in first interaction layer protocol data units 56A, 56B, 56C, 56D, respectively. The system 10 includes a reset mechanism in case of error where the sequences become out of schedule. Referring to FIG. 2, a respective reset bit 58A-D is added to the respective payload portions of the signal sequences 54A, 54B, 54C, 54D. The controller C is configured to set the value of the respective reset bits 58A-D with at least one of a first value and a second value upon occurrence of a transmission error. An example of a transmission error may be a temporal loss in connectivity with the network connection 30. The respective reset bits 58A-D are set to have a first value (e.g., one) when a transmission of a frame 62 has been reset and set to have a second value (e.g., zero) when the transmission of the frame 62 has not been reset. In other words, each frame 62 includes at least one reset bit to determine if the transmission has been reset at the sender's level, upon occurrence of a transmission error. As understood by those skilled in the art, a frame 62 is a digital data transmission unit. Thus, the system 10 prevents additional bus load by adding extra bit identifiers. The respective reset bits 58A-D may be availed from the reserved bits in the respective payload portions of the transmitted signal sequences 54A, 54B, 54C, 54D.

Referring to FIG. 2, the first plurality of interaction layer protocol data units 56 may be packaged in a frame 62 using a frame identifier (F100 in FIG. 2), in the driver layer 60. The frame 62 is subsequently transmitted via the network connection 30 (such as a CAN-BUS layer) based on the multiple signal sequences 54. Referring to FIGS. 2 and 3, in the example shown, at the first instance (time t=0), the frame 62 ("F100") carries individual signals s1, s2 and s4. At the second instance (time t=$t_1$), the frame 62 ("F100") carries individual signals s1, s3 and s5. At the third instance (time t=$t_2$), the frame 62 ("F100") carries individual signals s1 and s2. At the fourth instance (time t=$t_3$), the frame 62 ("F100") carries individual signals s1 and s3. Referring to FIG. 3, the controller C may include a counter unit 90 configured to track respective occurrences of a plurality of instances of the frame 62.

Referring to FIG. 3, the receiving terminal 16 may include a second communication layer 51 and a second driver layer 61. The second driver layer 61 may be a Controller Area Network (CAN) driver. The second driver layer 61 may be configured to operate or control an interface between the network connection 30 and the receiving terminal 16. The frame 62 ("F100") is received at the second driver layer 61 via the network connection 30. The frame 62 ("F100") may be received at multiple receiving terminals at the same time, such as secondary receiving terminal 42 shown in FIG. 1. The secondary receiving terminal 42 may include a structure similar to the receiving terminal 14. Using the look-up table T, the frame 62 ("F100") is extracted into a second plurality of interaction layer protocol data units 57 (I-PDU1, I-PDU2, I-PDU3, I-PDU4 in FIGS. 2-3). The multiple signal sequences 54 may then be decoded from the second plurality of interaction layer protocol data units 57. In the example shown, the signal sequences 54A, 54B, 54C, 54D are decoded from the second interaction layer protocol data units 57A, 57B, 57C, 57D, respectively. The plurality of signals 18 may be stored in a second plurality of buffers 53 (shown individually as B1, B2, B3, B4 and B5, in FIG. 3) in the second communication layer 51, prior to being communicated to the second application 40. The first and second plurality of buffers 52, 53 are respective regions of physical memory storage for temporarily storing data while it is being moved from one place to another. The first and second interaction layer protocol data units 56, 57 may contain control information, such as network address, or user data and are configured to store information as a unit for delivery among peer entities of the device 12.

Figure 4:
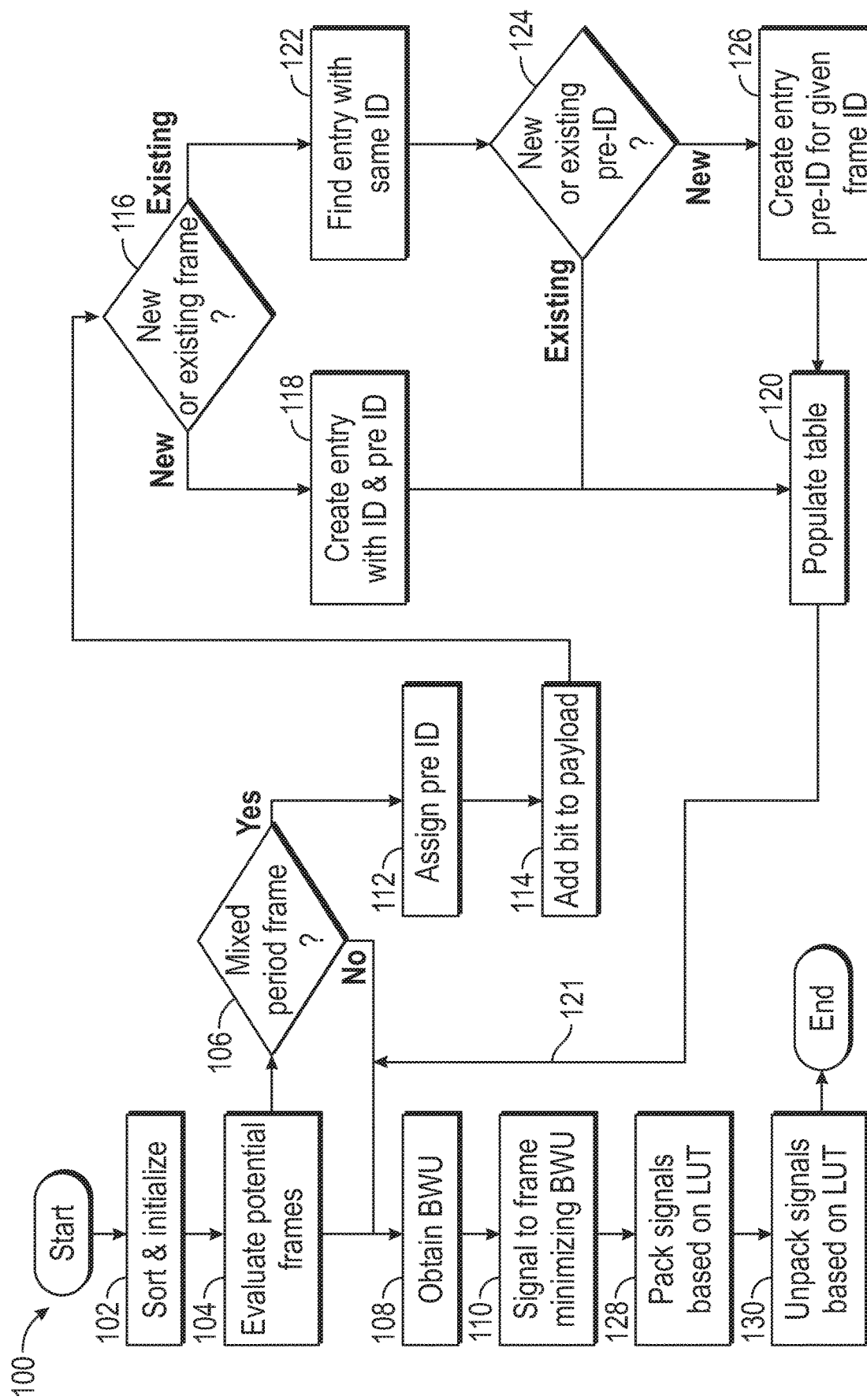
FIG. 4 is a schematic flow diagram for a method for controlling operation of the system of FIG. 1.

Referring now to FIG. 4, a flowchart of the method 100 stored on and executable by the controller C of FIG. 1 is shown. Method 100 need not be applied in the specific order recited herein. Furthermore, it is to be understood that some steps may be eliminated. The controller C of FIG. 1 is specifically programmed to execute the steps of the method 100 (as discussed in detail below with respect to FIG. 4).

Referring to FIG. 4, method 100 may begin with block 102, where the controller C is programmed or configured to sort and initialize the plurality of signals 18. The sorting may be based on factors such as periodicity, size and other factors and may be in ascending or descending order. In block 104 of FIG. 4, the controller C is configured to evaluate the addition of the plurality of signals 18 to multiple potential frames. In block 106 of FIG. 4, the controller C is configured to determine if the respective predefined periods vary in magnitude within each frame (such as frame 62 in FIGS. 2 and 3). If the respective predefined period is a constant, the method 100 proceeds to block 108, where the controller C is configured to determine respective bandwidth utilization factors for a plurality of potential frames.

The respective bandwidth utilization factor ("BWU" in FIG. 4) of a frame may be obtained as a ratio of maximum transmission time of the frame divided by its period. The maximum transmission time of the frame may be expressed as:

$$32*t_a+[28+(5(p-16)/64)+10p)]*t_d$$

Here p is the payload size in bytes, $t_a$ is the duration of transmission for each bit on an arbitration phase and $t_d$ is the duration of transmission for each bit in a data phase. It is to be appreciated that the formula of the bandwidth utilization factor may be varied. In block 110 of FIG. 4, the controller C is configured to compare the respective bandwidth utilization factors for a plurality of potential frames and add the plurality of signals 18 to one of the plurality of potential frames that has the minimum value of the respective bandwidth utilization factor.

If the respective predefined period varies in magnitude within the frame, the method 100 proceeds to block 112, where the controller C is configured to obtain or assign respective pre-identifiers for each of the plurality of signals 18. The respective pre-identifiers may be assigned based on periodicity or frequency. The respective sequence of the plurality of signals 18 is based at least partially on the respective pre-identifiers.

Each of the plurality of signals 18 has respective payload portions and respective header portions. If the respective predefined period varies in magnitude, per block 114 of FIG. 4, the controller C is configured to add at least one reset bit, such as respective reset bit 58A-D added to the transmitted signal sequences 54A, 54B, 54C, 54D in FIG. 2. The controller C is configured to set the value of the respective reset bits 58A-D with at least one of a first value and a second value upon occurrence of a transmission error. The respective reset bits 58A-D are configured to have a first value (e.g., one) when a transmission of the frame has been reset and configured to have a second value (e.g., zero) when the transmission of the frame has not been reset.

The method 100 proceeds to block 116, where the controller C is configured to determine if the frame is new or existing. If the frame is new, per block 118, a respective entry is created with a respective identifier and the respective pre-identifier. Per block 120 of FIG. 4, the controller C is configured to populate the respective entry in the look-up table T.

If the frame is existing (i.e., there is already an entry in the look-up table T with the respective identifier), the method 100 proceeds from block 116 to block 122, where the controller C is configured to locate the respective entry in the look-up table T having an identical value as the respective identifier. With respect to the example Table shown above, the controller C is configured to search if the identifier "100" already exists as an entry in the look-up table.

From block 122, the method 100 proceeds to block 124 where the controller C is configured to determine if the respective pre-identifier is new or existing. If the respective pre-identifier is existing, the method 100 proceeds from block 124 to block 120, where controller C is configured to populate the respective entry in the look-up table T. As indicated by line 121 in FIG. 4, the method 100 proceeds from block 120 to blocks 108 and 110 (as described above).

From block 110, the method 100 proceeds to blocks 128 and 130. Block 128 (described with respect to FIG. 2) includes packing the plurality of signals 18 in multiple signal sequences 54 into a frame 62 and transporting them from the transmitting terminal 14 to the receiving terminal 16, through the network connection 30. Block 130 (described with respect to FIG. 3) includes receiving and unpacking the multiple signal sequences 54 in the frame 62, at the receiving terminal 16.

If the respective pre-identifier is new, the method 100 proceeds from block 124 to block 126, where a respective entry is created with the respective pre-identifier. Per block 120, the controller C is configured to populate the respective entry in the look-up table. As indicated by line 121 in FIG. 4, the method 100 proceeds from block 120 to blocks 108, 110, 128 and 130 (as described above).

In summary, the system 10 is configured to employ the same frame (such as frame 62, with identifier F100 in FIGS. 2-3) with different signals at different instances, to allow more efficient bandwidth utilization. Additionally, the system 10 utilizes a "pre-identifier" and an "identifier" for each signal (such as signals s1, s2, s3, s4 and s5 in FIGS. 1-3) in the encoding and decoding process, with the addition of a look-up table ("T" in FIGS. 1-3) at the controller C instead of using the bandwidth of the network connection 30 for multiplexing. The look-up table T is used to determine the respective positions of the signals in the frame 62 at the receiving terminal 16. The addition of the look-up table T provides the technical advantage that the network bandwidth is not used for multiplexing the signals. The controller C (and execution of the method 100) improves the functioning of the device 12 by lowering bandwidth consumption, increasing efficiency in computation and lowering complexity. The controller C of FIG. 1 may be an integral portion of, or a separate module operatively connected to, other controllers of the device 12.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for transmission of a plurality of signals, the system comprising:
   a transmitting terminal configured to obtain and pack the plurality of signals in multiple signal sequences, each of the plurality of signals having respective predefined periods;
   a receiving terminal configured to receive and unpack the multiple signal sequences from the transmitting terminal;
   wherein the multiple signal sequences are configured to be packed in a frame and transported from the transmitting terminal to the receiving terminal via a network connection;
   wherein the transmitting terminal includes a first communication layer and a first driver layer, the first driver layer being configured to operate an interface between the network connection and the transmitting terminal;
   a controller in communication with the transmitting terminal and the receiving terminal and configured to store a look-up table having respective identifiers and respective pre-identifiers for each of the plurality of signals;
   wherein the controller includes a processor and tangible, non-transitory memory on which instructions are recorded, execution of the instructions by the processor causing the controller to:
      pack the plurality of signals in the multiple signal sequences into a first plurality of interaction layer protocol data units in the first communication layer;
      package the first plurality of interaction layer protocol data units in the frame using a frame identifier in the first driver layer;
      determine if the respective predefined periods vary in magnitude within the frame;
      if the respective predefined periods vary in magnitude within the frame, then obtain the respective pre-identifiers and the respective identifiers for each of the plurality of signals; and
   wherein the multiple signal sequences are based at least partially on the respective pre-identifiers and the respective identifiers in the look-up table.

2. The system of claim 1, wherein:
the receiving terminal includes a second communication layer and a second driver layer;
the controller is configured to extract the frame into a second plurality of interaction layer protocol data units based in part on the look-up table; and
the controller is configured to unpack the multiple signal sequences from the second plurality of interaction layer protocol data units in the second Driver layer into the plurality of signals.

3. The system of claim 2, wherein:
the controller includes a counter unit configured to track respective occurrences of a plurality of instances of the frame; and
prior to determining if the respective predefined periods vary in magnitude within the frame, the controller is configured to sort and initialize the plurality of signals.

4. The system of claim 1, wherein:
if the respective predefined periods are a constant, the controller is configured to:
determine a respective bandwidth utilization factor for a plurality of potential frames; and
add the plurality of signals to one of the plurality of potential frames having a minimum value of the respective bandwidth utilization factor.

5. The system of claim 1, wherein:
the multiple signal sequences include a respective payload portion and a respective header portion;
if the respective predefined periods vary in magnitude, then the controller is configured to add at least one reset bit to the respective payload portion of the multiple signal sequences;
wherein the controller is configured to set the at least one reset bit with at least one of a first value and a second value upon occurrence of a transmission error, the at least one reset bit being set with the first value when a transmission of the frame has been reset and the at least one reset bit being set with the second value when the transmission of the frame has not been reset.

6. The system of claim 1, wherein the controller is configured to:
if the respective predefined periods vary in magnitude, then determine if the frame is new or existing; and
if the frame is new, then create a respective entry with the respective identifier and the respective pre-identifier and populate the respective entry in the look-up table.

7. The system of claim 6, wherein the controller is configured to:
if the frame is existing, then locate the respective entry in the look-up table having an identical value as the respective identifier and determine if the respective pre-identifier is new or existing;
if the respective pre-identifier is existing, then populate the respective entry in the look-up table; and
if the respective pre-identifier is new, then create the respective entry with a respective pre-identifier and populate the respective entry in the look-up table.

8. The system of claim 1, further comprising:
a secondary receiving terminal configured to receive and unpack the multiple signal sequences from the transmitting terminal at a same time as the receiving terminal.

9. A method for transmission of a plurality of signals in a device having a transmitting terminal, a receiving terminal and a controller having a processor and tangible, non-transitory memory on which instructions are recorded, the method comprising:
creating a look-up table in the controller, the look-up table including a respective pre-identifier and a respective identifier for each of the plurality of signals;
obtaining and packing the plurality of signals in multiple signal sequences, via the transmitting terminal, each of the plurality of signals having respective predefined periods;
packing the multiple signal sequences into a frame and transporting from the transmitting terminal to the receiving terminal through a network connection, via the controller;
receiving and unpacking the multiple signal sequences in the frame, via the receiving terminal;
determining if the respective predefined periods vary in magnitude within a frame, via the controller;
providing a first communication layer and a first driver layer in the transmitting terminal;
packing the plurality of signals in the multiple signal sequences into a first plurality of interaction layer protocol data units in the first communication layer;
packaging the first plurality of interaction layer protocol data units in the frame using a frame identifier in the first driver layer;
if the respective predefined periods vary in magnitude within the frame, then obtaining the respective pre-identifiers for each of the plurality of signals, via the controller; and
wherein the multiple signal sequences are based at least partially on the respective pre-identifiers and the respective identifiers in the look-up table.

10. The method of claim 9, further comprising:
providing a second communication layer and a second driver layer in the receiving terminal;
extracting the frame into a second plurality of interaction layer protocol data units based in part on the look-up table; and
unpacking the multiple signal sequences from the second plurality of interaction layer protocol data units in the second driver layer into the plurality of signals.

11. The method of claim 10, further comprising:
prior to determining if the respective predefined periods vary in magnitude within the frame, sorting and initializing the plurality of signals, via the controller.

12. The method of claim 10, further comprising:
if the respective predefined periods are a constant, then determining a respective bandwidth utilization factor for a plurality of potential frames, via the controller; and
adding the plurality of signals to one of the plurality of potential frames having a minimum value of the respective bandwidth utilization factor, via the controller.

13. The method of claim 10, wherein each of the plurality of signals has respective payload portions and respective header portions, and further comprising:
if the respective predefined periods vary in magnitude, then adding at least one reset bit to the respective payload portions; and
setting the at least one reset bit with at least one of a first value and a second value upon occurrence of a transmission error, via the controller, the at least one reset bit being set with the first value when a transmission of the frame has been reset and the at least one reset bit being set with the second value when the transmission of the frame has not been reset.

14. The method of claim 10, further comprising:
if the respective predefined periods vary in magnitude, then determining if the frame is new or existing; and if the frame is new, then creating a respective entry with the respective identifier and the respective pre-identifier and populating the respective entry in the look-up table.

15. The method of claim 14, further comprising:
if the frame is existing, then locating the respective entry in the look-up table having an identical value of the respective identifier and determining if the respective pre-identifier is new or existing;
if the respective pre-identifier is existing, then populating the respective entry in the look-up table; and
if the respective pre-identifier is new, then creating the respective entry with a respective pre-identifier and populate the respective entry in the look-up table.

16. A system for transmission of a plurality of signals, the system comprising:
a transmitting terminal configured to obtain and pack the plurality of signals in multiple signal sequences, each of the plurality of signals having respective predefined periods;
a receiving terminal configured to receive and unpack the multiple signal sequences from the transmitting terminal;
wherein the multiple signal sequences are configured to be packed in a frame and transported from the transmitting terminal to the receiving terminal via a network connection;
a secondary receiving terminal configured to receive and unpack the multiple signal sequences from the transmitting terminal at a same time as the receiving terminal;
a controller in communication with the transmitting terminal and the receiving terminal and configured to store a look-up table having respective identifiers and respective pre-identifiers for each of the plurality of signals;
wherein the controller includes a processor and tangible, non-transitory memory on which instructions are recorded, execution of the instructions by the processor causing the controller to:
determine if the respective predefined periods vary in magnitude within the frame;
if the respective predefined periods vary in magnitude within the frame, then obtain the respective pre-identifiers and the respective identifiers for each of the plurality of signals; and
wherein the multiple signal sequences are based at least partially on the respective pre-identifiers and the respective identifiers in the look-up table.

17. The system of claim 16, wherein:
if the respective predefined periods are a constant, the controller is configured to:
determine a respective bandwidth utilization factor for a plurality of potential frames; and
add the plurality of signals to one of the plurality of potential frames having a minimum value of the respective bandwidth utilization factor.

18. The system of claim 16, wherein:
the multiple signal sequences include a respective payload portion and a respective header portion;
if the respective predefined periods vary in magnitude, then the controller is configured to add at least one reset bit to the respective payload portion of the multiple signal sequences;
wherein the controller is configured to set the at least one reset bit with at least one of a first value and a second value upon occurrence of a transmission error, the at least one reset bit being set with the first value when a transmission of the frame has been reset and the at least one reset bit being set with the second value when the transmission of the frame has not been reset.

19. The system of claim 16, wherein the controller is configured to:
if the respective predefined periods vary in magnitude, then determine if the frame is new or existing; and
if the frame is new, then create a respective entry with the respective identifier and the respective pre-identifier and populate the respective entry in the look-up table.

20. The system of claim 19, wherein the controller is configured to:
if the frame is existing, then locate the respective entry in the look-up table having an identical value as the respective identifier and determine if the respective pre-identifier is new or existing;
if the respective pre-identifier is existing, then populate the respective entry in the look-up table; and
if the respective pre-identifier is new, then create the respective entry with a respective pre-identifier and populate the respective entry in the look-up table.

* * * * *